(12) United States Patent
    Holmes (10) Patent No.: US 10,880,711 B1
(45) Date of Patent: Dec. 29, 2020

(54) ELECTRONIC SUBSCRIBER IDENTITY MODULE (ESIM) MANAGEMENT PLATFORM

(71) Applicant: Sprint Communications Company L.P., Overland Park, KS (US)

(72) Inventor: David William James Holmes, Sammamish, WA (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

(21) Appl. No.: 16/799,960

(22) Filed: Feb. 25, 2020

(51) Int. Cl.
    *H04W 4/50* (2018.01)
    *H04W 8/24* (2009.01)
    *H04W 88/18* (2009.01)

(52) U.S. Cl.
    CPC ............. *H04W 4/50* (2018.02); *H04W 8/245* (2013.01); *H04W 88/18* (2013.01)

(58) Field of Classification Search
    None
    See application file for complete search history.

(56) References Cited

U.S. PATENT DOCUMENTS

| | | | | |
|---|---|---|---|---|
| 2006/0089989 A1* | 4/2006 | Khan | .................... | H04W 40/02 709/225 |
| 2017/0064552 A1* | 3/2017 | Park | .................... | H04L 63/0869 |
| 2017/0142121 A1* | 5/2017 | Lee | ........................ | H04L 63/102 |
| 2020/0228962 A1* | 7/2020 | Park | ...................... | H04W 12/04 |

FOREIGN PATENT DOCUMENTS

CN    109495874 A  *  3/2019

OTHER PUBLICATIONS

Machine Translation of CN109495874A (Year: 2018).*

* cited by examiner

*Primary Examiner* — German Viana Di Prisco (57) ABSTRACT

A method of provisioning an electronic subscriber identity module (eSIM) to a wireless communication device. The method comprises provisioning an eSIM profile into an eSIM of a virtual eSIM provisioning platform provided by a computer system and where the eSIM profile comprises wireless communication service provider data and wireless communication service subscriber data, partitioning by an eSIM provisioning application a process of writing the eSIM profile to an eSIM of a wireless communication device into a plurality of messages, whereby the complexity of provisioning the eSIM profile to the eSIM of the wireless communication device is handled by the intelligence of the eSIM provisioning application, establishing wireless communication by the eSIM provisioning application with a wireless communication device having an eSIM, and sending the messages by the eSIM provisioning application to the eSIM of the wireless communication device.

7 Claims, 9 Drawing Sheets

ELECTRONIC SUBSCRIBER IDENTITY MODULE (ESIM) MANAGEMENT PLATFORM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some wireless communication devices are provided with a removable subscriber identity module (SIM) that defines wireless communication service provider data and wireless communication service subscriber data. Some of this data may be presented by the wireless communication device, for example, when authenticating into the radio access network (RAN) to obtain a wireless communication link. When a subscriber desired to change wireless service from a first wireless communication service provider to a second wireless communication service provider, he or she could buy a SIM provided by the second wireless communication service provider, remove the SIM associated with the first wireless communication service provider from the wireless communication device, and install the SIM associated with the second wireless communication service provider into the wireless communication device. In some cases, new technology is replacing removable SIMs with eSIMs that comprise a SIM that is embedded in the wireless communication device and is not removable (e.g., is not removable by a lay person without a high risk of damaging the device). In the eSIM paradigm, a wireless communication device may be provisioned for wireless communication service on a RAN by loading appropriate data into the embedded eSIM in the wireless communication device.

SUMMARY

In an embodiment, a method of provisioning an electronic subscriber identity module (eSIM) to a wireless communication device is disclosed. The method comprises provisioning an electronic subscriber identity module (eSIM) profile into an eSIM of a virtual eSIM provisioning platform, where the virtual eSIM provisioning platform is provided by a computer system and where the eSIM profile comprises wireless communication service provider data and wireless communication service subscriber data and partitioning, by an eSIM provisioning application executing on the virtual eSIM provisioning platform, a process of writing the eSIM profile to an eSIM of a wireless communication device into a plurality of messages, whereby the complexity of provisioning the eSIM profile to the eSIM of the wireless communication device is handled by the intelligence of the eSIM provisioning application. The method further comprises establishing wireless communication by the eSIM provisioning application with a wireless communication device having an eSIM and sending the messages by the eSIM provisioning application to the eSIM of the wireless communication device, whereby the eSIM provisioning application provisions the eSIM of the wireless communication device.

In another embodiment, a method of provisioning an electronic subscriber identity module (eSIM) to a wireless communication device. The method comprises receiving input defining an electronic subscriber identity module (eSIM) profile by a user console application executing on a virtual eSIM provisioning platform, where the virtual eSIM provisioning platform is provided by a computer and where the eSIM profile comprises wireless communication service provider data and wireless communication service subscriber data and provisioning the eSIM profile into an eSIM of the virtual eSIM provisioning platform by the user console application. The method further comprises reading the eSIM profile from the eSIM of the virtual eSIM provisioning platform by an eSIM provisioning application executing on the virtual eSIM provisioning platform and partitioning the eSIM profile into a plurality of segments by the eSIM provisioning application. The method further comprises establishing a plurality of wireless communication links, by the eSIM provisioning application, with a wireless communication device having an eSIM, each wireless communication link established at a different time and sending each of the segments of the eSIM profile at a different time by the eSIM provisioning application to the wireless communication device via one of the wireless communication links, whereby the eSIM profile is incrementally transmitted to the wireless communication device, and whereby the wireless communication device configures the eSIM in the wireless communication device based on the eSIM profile.

In yet another embodiment, a method of provisioning an electronic subscriber identity module (eSIM) to a wireless communication device is disclosed. The method comprises receiving input defining a plurality of electronic subscriber identity module (eSIM) profiles by a user console application executing on a computer, where the eSIM profiles comprise wireless communication service provider data and wireless communication service subscriber data, sending the eSIM profiles by the user console application to a staging eSIM that is provided by the computer, and storing the eSIM profiles by the staging eSIM. The method further comprises sending a first eSIM profile by the staging eSIM to a wireless communication device having an eSIM, selecting a second eSIM profile from the plurality of stored eSIM profiles by the staging eSIM, and sending the second eSIM profile by the staging eSIM to the wireless communication device, whereby an eSIM in the wireless communication device is adapted to communicate in a different wireless communication environment.

In yet another embodiment, a method of provisioning an electronic subscriber identity module (eSIM) to a wireless communication device is disclosed. The method comprises receiving an electronic subscriber identity module (eSIM) profile by a staging eSIM, where the staging eSIM is provided by a computer and the eSIM profile comprises wireless communication service provider data and wireless communication service subscriber data and partitioning a process of writing the eSIM profile to the eSIM of the wireless communication device into a plurality of messages by the staging eSIM, whereby the complexity of provisioning the eSIM profile to the eSIM of the wireless communication device is handled by the intelligence of the staging eSIM. The method further comprises establishing wireless communication by the staging eSIM with a wireless communication device having an eSIM and sending the messages by the staging eSIM to the eSIM of the wireless communication device.

In yet another embodiment, a method of provisioning an electronic subscriber identity module (eSIM) to a wireless communication device is disclosed. The method comprises receiving input defining an electronic subscriber identity module (eSIM) profile by a user console application executing on a computer, where the eSIM profile comprises wireless communication service provider data and wireless communication service subscriber data, sending the eSIM profile by the user console application to a staging eSIM that is provided by the computer, and storing the eSIM profile by the staging eSIM. The method further comprises partitioning the eSIM profile into a plurality of segments by the staging eSIM, establishing a plurality of wireless communication links by the staging eSIM with a wireless communication device having an eSIM, each wireless communication link established at a different time, and sending each of the segments of the eSIM profile at a different time by the staging eSIM to the wireless communication device via one of the wireless communication links, whereby the eSIM profile is incrementally transmitted to the wireless communication device, and whereby the wireless communication device configures the eSIM in the wireless communication device based on the eSIM profile.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The disclosure teaches a system for provisioning eSIMs on wireless communication devices. Some wireless communication devices may not have conventional user interfaces which may make selecting and installing eSIM profiles into the eSIMs difficult. These eSIM profiles define wireless communication service provider data and wireless communication service subscriber data. It is projected that a great number of Internet of things (IoT) devices having eSIMs may be provisioned to receive wireless communication service in the near future, and yet many of these IoT devices may not have conventional user interfaces. The system for provisioning eSIMs described herein provides a solution to this problem.

In an embodiment, a virtual eSIM provisioning platform is provided that has a front end for working with users and a back end for communicating with wireless communication devices having eSIMs. In an embodiment, a user may access a web interface extended by a user console application of the virtual eSIM provisioning platform to define and configure one or more eSIM profiles. The user console application provisions the eSIM profile into an eSIM of the virtual eSIM provisioning platform. Said in other words, the user console application writes the eSIM profiles to the eSIM of the virtual eSIM provisioning platform.

The eSIMs may be part of a staging eSIM component of the virtual eSIM provisioning platform in what may be referred to as virtual eSIMs. Virtual eSIMs are portions of memory in the staging eSIM component (or in the computer system on which the virtual eSIM provisioning platform executes). A virtual eSIM may be considered to mirror an acutal eSIM on the target wireless communication device. Alternatively, the eSIM profiles may be stored by the staging eSIM component in what may be referred to as physical eSIMs. The physical eSIMs of a staging eSIM component may be physical chips or blocks on chips, (for example chips on a circuit board in a computer system on which the virtual eSIM provisioning platform executes). The physical eSIMs of a staging eSIM component may be embedded universal integrated circuit cards (eUICCs). A physical eSIM also may be considered to mirror an actual eSIM on the target wireless communication device. In an embodiment, a single virtual eSIM may store a plurality of different eSIM profiles, and a single physical eSIM may store a plurality of different eSIM profiles.

An eSIM provisioning application of the staging eSIM component may establish a communication link with the target wireless communication device and manages transfer and installation of the eSIM profile from the staging eSIM component (e.g., from the virtual eSIM in the staging eSIM component or from the physical eSIM in the staging eSIM component) to the eSIM of the target wireless communication device. This process may be referred to as mirroring the eSIM of the staging eSIM component (the virtual eSIM or the physical eSIM) to the actual eSIM of the target wireless communication device or synchronizing the actual eSIM of the target wireless communication device with the eSIM in the staging eSIM component. The virtual eSIM provisioning platform described herein decouples the process of defining and inputting the eSIM profile or eSIM profiles from the process of provisioning the eSIM on the mobile communication devices. The mirroring and/or synchronizing of the eSIM in the staging eSIM component to the eSIM on the mobile communication device (e.g., transferring eSIM profile data) need not take place in real-time (e.g., need not take place while a user is actively engaged with a user interface extended by the user console application).

The transfer and installation of the eSIM profile to the eSIM of the target wireless communication device may employ standard or modified standard eSIM provisioning processes. For example, in an embodiment, the eSIM provisioning application may emulate the protocols used by an SM-DP+ provisioning server when communicating with the actual eSIM in the wireless communication device. The eSIM provisioning application, however, may adapt these otherwise standard protocols to accommodate limitations of bandwidth, limitations of communication channel latency, and limitations of up-time of the wireless communication devices themselves. In an embodiment, because the communications between the staging eSIM component and the actual eSIM are secure and private, the eSIM in the staging eSIM (e.g., virtual eSIM or physical eSIM) and the actual eSIM in the wireless communication device may be identified using the same electronic identification (EID). The user may input the EID of the actual eSIM via the user interface. The EID of the actual eSIM may be read by the user from device packaging or labelling.

Different wireless communication devices, especially in the context of IoT devices, are expected to be manufactured with different levels of processing and memory resources. In devices having ample processing and memory resources, the eSIM provisioning application can focus on transferring the content of the eSIM profile (stored in the virtual eSIM or in the physical eSIM of the staging eSIM component) to the target device, delegating to the target device the activity of configuring the actual eSIM based on the eSIM profile. For example, the eSIM provisioning application may write the eSIM profile into a memory cache location of the target device, and a local profile assistant (LPA) executing on the target device may configure the actual eSIM based on the eSIM profile stored in memory cache.

Even in the case of such a high capability wireless communication device, however, there may be complications involved in the eSIM provisioning application transferring the eSIM profile to the target device. For example, even high capability wireless communication devices in the IoT environment may turn themselves off frequently as a battery power conservation strategy. Hence, the eSIM provisioning application may desirably manage transfer of the eSIM profile to the target wireless communication device over a sequence of several different wireless communication links and/or communication sessions. The eSIM provisioning application may also manage transfer of the eSIM profile to the target device when the wireless communication link to the device is a low bandwidth link and/or a high latency channel. The eSIM provisioning application can manage the flow of messages and eSIM profile information accordingly. As the actual eSIM of the wireless communication device is progressively provisioned, the wireless communication device may send state equivalency messages or state status messages to the eSIM provisioning application, whereby the eSIM provisioning application can verify the current state of the mirroring and/or synchronizing operation.

In wireless communication devices having insufficient processing and/or insufficient memory resources, the eSIM provisioning application may execute low level commands to write data into the actual eSIM on the target device without either caching the eSIM profile on the target device or executing an LPA on the target device to map high level eSIM profile data into specific memory locations in the actual eSIM. For example, the eSIM provisioning application may embody the functionality of an LPA and interact with the actual eSIM in accordance with the functionality of this LPA module. The eSIM provisioning application may also manage transfer of eSIM profiles from the staging eSIM component (e.g., virtual eSIMs or physical eSIMS in the staging eSIM component) to the actual eSIM on target devices that have capabilities intermediate between these two extreme examples. When mirroring the virtual eSIM or the physical eSIM in the staging eSIM component to the actual eSIM on the target wireless communication device has been completed, the target device may send an acknowledgement back to the virtual eSIM provisioning platform, and the virtual eSIM provisioning platform may send an acknowledgement message to the user.

In an embodiment, the staging eSIM component may store a plurality of eSIM profiles for the same target wireless communication device. The plurality of eSIM profiles may be stored in a single virtual eSIM or in a single physical eSIM on the staging eSIM component. In response to a triggering event, the eSIM provisioning application may transfer a selected one of the eSIM profiles to the target device as described above. This may relieve the target wireless communication device of the burden of storing multiple eSIM profiles in the eSIM of the target device. The trigger may be issued by the target wireless communication device itself, for example when it detects that it has moved from a first wireless communication service region into a second wireless communication service region. The target wireless communication device may select the desired replacement eSIM profile. Alternatively, the eSIM provisioning application may select the desired replacement eSIM profile to transfer to the actual eSIM of the target device based on selection rules configured into the eSIM provisioning application by the user via the user console of the virtual eSIM provisioning platform at the same time the eSIM profiles are configured by the user.

The deployment of eSIM profiles to IoT devices presents a technical problem for conventional eSIM provisioning systems that may rely upon a single continuous communication link to the wireless communication device having the eSIM and also rely upon a high-bandwidth communication link. By decoupling the front-end of the eSIM provisioning system that provides eSIM profile information from the back-end process of writing data into the eSIM on the wireless communication device, this technical problem can be overcome. In an embodiment, the virtual eSIM provisioning platform conducts the front-end operation as a provisioning operation—an instance of virtually provisioning. By virtually provisioning the eSIM profile to an eSIM in the virtual eSIM provisioning platform (either a virtual eSIM or a physical eSIM), the back-end can cope with low-bandwidth communication links to IoT devices as well as communication sessions that extend over a series of off-line episodes of the target wireless communication devices.

Figure 1:
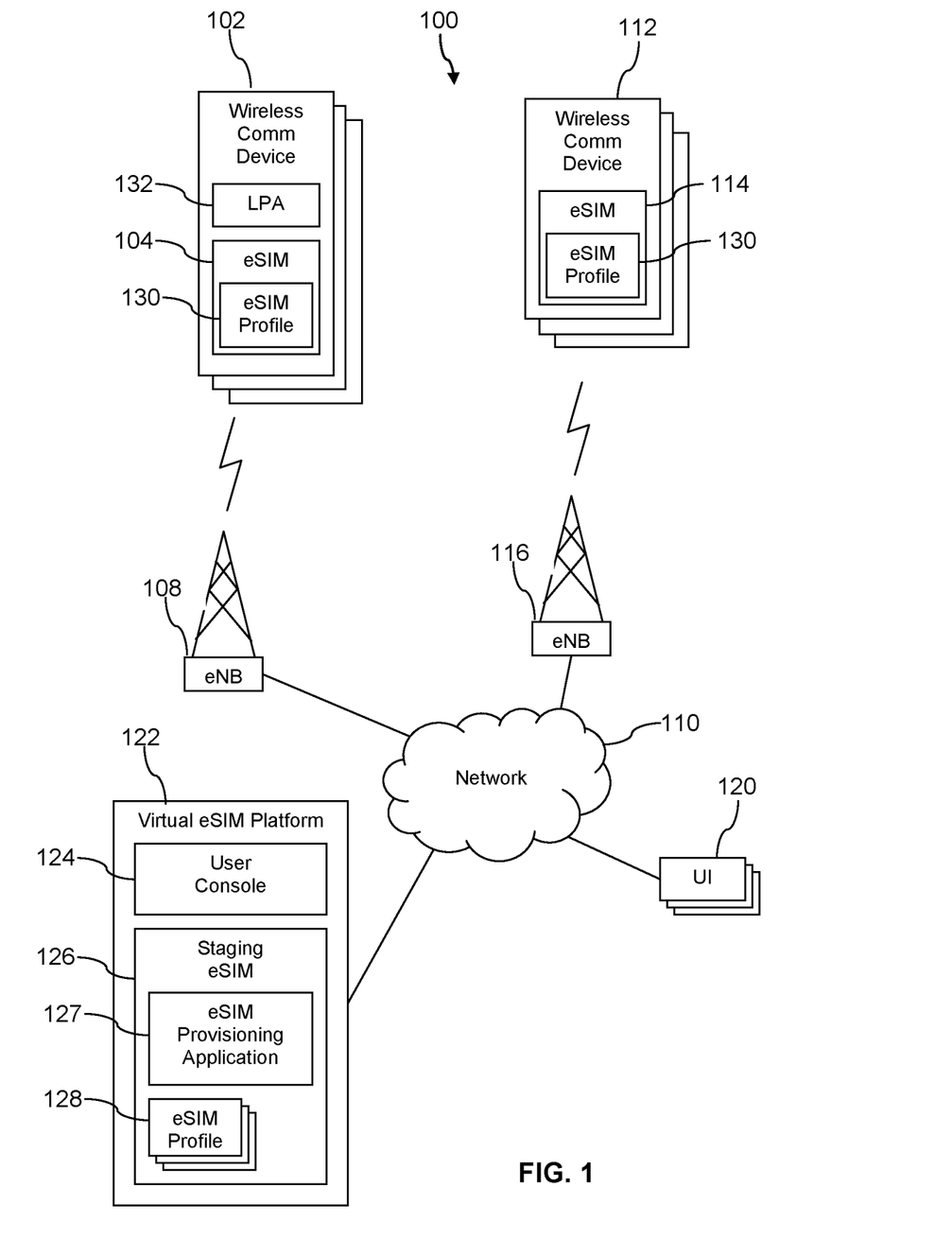
FIG. 1 is a block diagram of a communication system according to an embodiment of the disclosure.

Turning now to FIG. 1, a system 100 is described. In an embodiment, the system 100 comprises a first plurality of wireless communication devices 102 each having an electronic subscriber identity module (eSIM) 104. An eSIM may be referred to as an embedded SIM card in some contexts. An eSIM is an electronic component that is typically non-removable (e.g., is not removable by a lay person without significant risk of damage). A removable eSIM (embedded universal integrated circuit card (eUICC) would not typically be found in a low-cost and/or low power wireless communication device. An eSIM may be soldered or otherwise electrically connected to a motherboard of a wireless communication device. An eSIM may be a portion of a system on a chip (SoC). The eSIM 104 may store wireless communication service provider data and wireless communication service subscriber data, for example in the form of an eSIM profile 130. The wireless communication device 102 may be an Internet of things (IoT) device. The wireless communication device 102 may be a mobile phone, a smart phone, a wearable computer, a headset computer, a laptop computer, a tablet computer, or a notebook computer.

The wireless communication device 102 may establish a wireless communication link with a cell site 108 based on authentication and/or access credentials provided by the device 102, where these credentials are obtained from the eSIM 104 (e.g., from the eSIM profile 130). The cell site 108 provides communications coupling of the wireless communication device 102 to a network 110. The network 110 is one or more private networks, one or more public networks, or a combination thereof. The wireless communication device 102 may establish a wireless communication link with the cell site 108 according to a 5G telecommunication protocol, a long term evolution (LTE) telecommunication protocol, a code division multiple access (CDMA) telecommunication protocol, a global system for mobile communications (GSM) telecommunication protocol, or another telecommunication protocol. While a cell site 108 is depicted in FIG. 1, the wireless communication device 102 may communicate to the network 110 via a wireless access point (AP) using a WiFi or a Bluetooth wireless communication protocol. The wireless communication devices 102 may communicate with application server computers, web servers, gaming servers, data bases, and/or other wireless communication devices via the network 110.

The system 100 may comprise a second plurality of wireless communication devices 112 that each comprise an eSIM 114 that may store wireless communication service provider data and wireless communication service subscriber data, for example in the eSIM profile 130. The wireless communication device 112 may establish a wireless communication link with a cell site 116 based on authentication and/or access credentials provided by the device 112, where these credentials are obtained from the eSIM 114 (e.g., from the eSIM profile 130). The cell site 116 provides communications coupling of the wireless communication device 104 to the network 110.

The wireless communication device 112 may establish a wireless communication link with the cell site 116 according to a 5G telecommunication protocol, a long term evolution (LTE) telecommunication protocol, a code division multiple access (CDMA) telecommunication protocol, a global system for mobile communications (GSM) telecommunication protocol, or another telecommunication protocol. While a cell site 116 is depicted in FIG. 1, the wireless communication device 112 may communicate to the network 110 via a wireless access point (AP) using a WiFi or a Bluetooth wireless communication protocol. The wireless communication devices 112 may communicate with application server computers, web servers, gaming servers, data bases, and/or other wireless communication devices via the network 110. The wireless communication device 2 may be an Internet of things (IoT) device. The wireless communication device 112 may be a smart phone, a wearable computer, a headset computer, a laptop computer, a tablet computer, or a notebook computer. The system 100 may comprise any number of wireless communication devices 102, 112, any number of cell sites 108, 116. While the devices 102 are illustrated as in wireless communication with the first cell site 108 and the devices 112 are illustrated as in wireless communication with the second cell site 116, it is understood that any of the devices 102, 112 may establish wireless communication links with any of the cell sites 108, 116.

The system 100 further comprises a virtual eSIM provisioning platform 122 that extends one or more user interfaces (UI) 120 that execute on computers, for example on work stations, laptop computers, or desktop computers. The virtual eSIM provisioning platform 122 may execute on and/or be provided by a computer system. Computers are discussed further hereinafter. The virtual eSIM provisioning platform 122 comprises a user console application 124 and a staging eSIM component 126. The user console application 124 extends the UI 120. For example, the UI 120 may be a web interface presented by the user console application 124 on the user's computer or other device (e.g., in an application or browser). A user is able to use the UI 120 to define one or more eSIM profiles to the user console application 124. A user may be associated with a small business that has deployed a plurality of wireless communication devices 102, 112 who desires to configure one or more eSIM profiles into the small business's devices 102, 112. A user may be an individual subscriber to wireless communication services.

The user console application 124 communicates the eSIM profile or eSIM profiles to a staging eSIM component 126 on the virtual eSIM provisioning platform 122. The staging eSIM component 126 stores the eSIM profiles 128. In some contexts, the staging eSIM component 126 may be referred to as the staging eSIM. The user by providing eSIM profile definition inputs via the UI 120 may be said to have provisioned an eSIM located in the virtual eSIM provisioning platform 122 (e.g., in the staging eSIM component 126). The staging eSIM component 126 comprises an eSIM provisioning application 127 that interworks with one or more of the eSIMs 104 of wireless communication devices 102 and/or with one or more of the eSIMs 114 of wireless communication devices 112 to install wireless communication service provider data and wireless communication service subscriber data (e.g., an eSIM profile 128) into the eSIMs 104, 114 accordingly. The staging eSIM component 126 may communicate with the wireless communication device 102, 112 wirelessly as described above or via a wired connection, for example via a universal serial bus (USB) connection.

The wireless communication devices 102 may have relatively greater capability than the wireless communication devices 112. For example, the wireless communication devices 102 may have sufficient memory to store at least one eSIM profile 130 on board and sufficient processing power to execute a local profile assistant (LPA) 132 application. In the case of the wireless communication devices 102, the eSIM provisioning application 127 can write at least one eSIM profile 127 to the wireless communication device 102 as the eSIM profile 130 and delegate to the wireless communication device 102 the activity of configuring the eSIM 104 based on the eSIM profile 130. For example, the eSIM provisioning application 127 may copy data stored in the eSIM profile 128 to a non-transitory portion of memory in the wireless communication device 102. The LPA 132 may then write this data to the eSIM 104 in the form of the eSIM profile 130. An eSIM profile 128, 130 may have a standardized form that desirably is mapped to a non-standard organization or representation in the eSIM 104, 114. Thus, the eSIM profile 128 written to different eSIMs 104, 114 in different devices may be stored, arranged, and represented differently in the different eSIMs 104, 114. Additionally, the low level operations that the LPA 132 executes to write to the eSIM 104 may be different for different brands and/or models of devices 102.

While the wireless communication device 102 may feature relatively high capabilities, it may be configured to operate in such a way as to conserve battery power. IoT devices, for example, may be deployed to remote locations and expected to operate with the same battery for several years before depleting the battery. To the purpose of extending service life, the wireless communication device 102 may power on, perform some operations, and then power back down. When powered on, the wireless communication device 102 may capture sensor data, log the sensor data, and power back down. Periodically, during such a powered on operation cycle, the wireless communication device 102 may send the log of sensor data via the cell site 108 and via the network 110 to a data store (not shown).

The powering on and powering off of the wireless communication device 102 may present some challenges to transmitting the eSIM profile 128 to the eSIM profile 130 on the wireless communication device 102. The eSIM provisioning application 127 may segment the eSIM profile 128 into multiple segments and accomplish the writing of the eSIM profile 128 to the eSIM profile 130 via a series of separate write cycles completed over several different powered on cycles of the wireless communication device 102. When the eSIM profile 128 has been completely written into the eSIM profile 130 on the wireless communication device 102, the eSIM profile 130 may be said to mirror the eSIM profile 128 and the eSIM profiles 128, 130 may be said to be synchronized with each other.

Because the wireless communication devices 112 may be lower capability devices, there may not be sufficient memory resources on the wireless communication devices 112 to store the data contained in the eSIM profile 128. Additionally, the wireless communication devices 112 may not have an LPA 132 on board which can handle writing wireless communication service provider data and wireless communication service subscriber data into the eSIM 114. Under one or both of these circumstances, the eSIM provisioning application 127 may take responsibility for writing wireless communication service provider data and wireless communication service subscriber data in a suitable form into appropriate locations in the eSIM 114 in the form of the eSIM profile 130 of the wireless communication devices 112. This may entail the eSIM provisioning application 127 sending low level write commands to the wireless communication device 112 to configure the eSIM 114 with the eSIM profile 130. These may be referred to in some contexts as device driver commands. It is understood that the eSIM provisioning application 127 may adapt the low level write commands to the particular requirements of different brands and/or different models of wireless communication devices 112. Said in other words, the eSIM provisioning application 127 may map the same eSIM profile 128 into a different series of low level commands for writing the wireless communication service provider data and the wireless communication service subscriber data store in the eSIM profile 128 into different brands and/or models of wireless communication devices 112.

In an embodiment, the staging eSIM component 126 may store a plurality of different eSIM profiles 128 associated with the same target wireless communication device 102, 112. The wireless communication device 102, 112 may command the staging eSIM component 126 to install one of the eSIM profiles 128 stored by the staging eSIM component 126 onto the device 102, 112. The device 102, 112 may itself select the eSIM profile 128 to be installed. Alternatively, the device 102, 112 may delegate to the eSIM provisioning application 127 to select the eSIM profile 128 based on selection rules executed by the eSIM provisioning application 127. These selection rules may be configured into the eSIM provisioning application 127 by the user via the UI 120 in association with defining the eSIM profiles 128. The eSIM profile 104, 114 may be changed when some aspect of the environment of the wireless communication device 102, 112 changes, for example the device 102, 112 moves into a different location and/or country. As an example, the wireless communication device 112 may be attached to a shipping container that may move between countries. In some cases, when the device 112 crosses into a different country, the eSIM profile 114 may desirably be changed to interwork with a different wireless communication service provider in the current country.

Figure 2A:
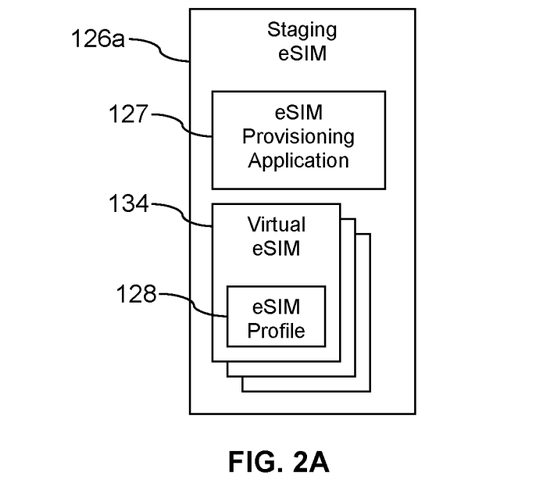
FIG. 2A is a block diagram of a staging electronic subscriber identity module (eSIM) according to an embodiment of the disclosure.

Turning now to FIG. 2A, a first embodiment of the staging eSIM component 126 is described. A first staging eSIM component 126a comprises the eSIM provisioning application 127 and a plurality of virtual eSIMs 134, each virtual eSIM 134 storing one or more eSIM profiles 128. The eSIM provisioning application 127 performs the interactions with the user console 124 and with the mobile communication devices 102, 112 as described above. The virtual eSIMs 134 and the eSIM profiles 128 are stored in a non-transitory memory of the virtual eSIM provisioning platform 122. Said in other words, the virtual eSIMs 134 are data objects or data artifacts stored in non-transitory memory of the virtual eSIM provisioning platform 122.

Figure 2B:
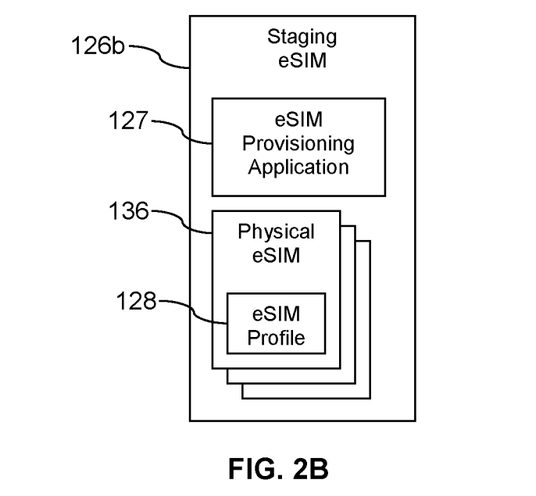
FIG. 2B is a block diagram of another staging eSIM according to an embodiment of the disclosure.

Turning now to FIG. 2B, a second embodiment of the staging eSIM component 126 is described. A second staging eSIM component 126b comprises the eSIM provisioning application 127 and a plurality of physical eSIMs 136, each physical eSIM 136 storing one or more eSIM profiles 128. Each physical eSIM 136 is a hardware device or a block of a hardware device corresponding to an eSIM or to a eUICC. The physical eSIMs 136 are not data objects or data artifacts, although they comprise data (e.g., comprise the eSIM profile(s) 128). The physical eSIMs 136 may comprise semiconductor logic such as a logic processor block or core. The physical eSIMs 136 may be installed on a circuit board coupled to a processor board of the virtual eSIM provisioning platform 122. In an embodiment, advantages and benefits may be obtained in some environments by embedding physical eSIMs 136 in the virtual eSIM provisioning platform 122. The eSIM provisioning application 127 may copy the eSIM profiles 128 stored in a physical eSIM 136 to an actual eSIM in a target wireless communication device, for example to the eSIM 104, 114.

Figure 3:
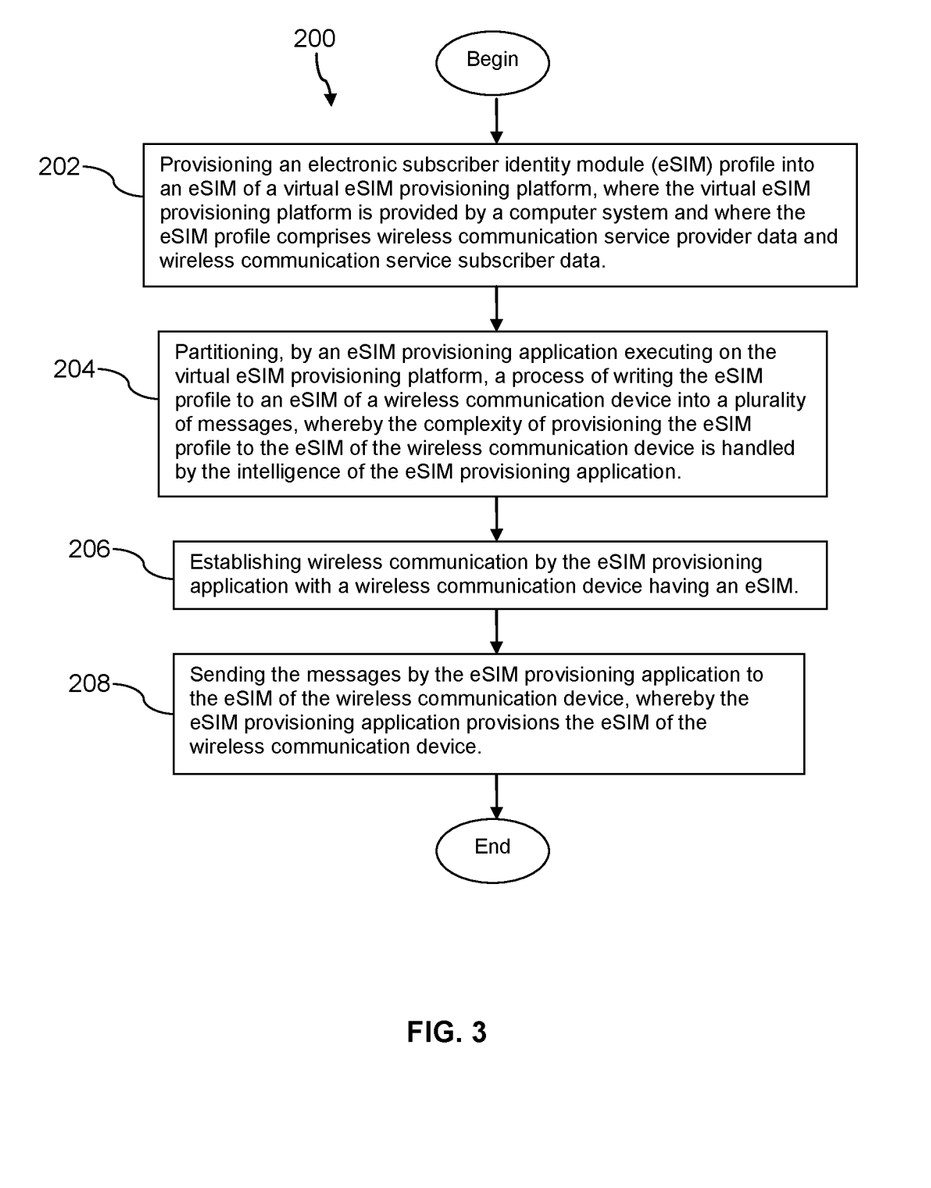
FIG. 3 is a flow chart of a method according to an embodiment of the disclosure.

Turning now to FIG. 3, a method 200 is described. In an embodiment, the method 200 is a method of provisioning an electronic subscriber identity module (eSIM) to a wireless communication device. At block 202, the method 200 comprises provisioning an electronic subscriber identity module (eSIM) profile into an eSIM of a virtual eSIM provisioning platform, where the virtual eSIM provisioning platform is provided by a computer system and where the eSIM profile comprises wireless communication service provider data and wireless communication service subscriber data.

At block 204, the method 200 comprises partitioning, by an eSIM provisioning application executing on the virtual eSIM provisioning platform, a process of writing the eSIM profile to an eSIM of a wireless communication device into a plurality of messages, whereby the complexity of provisioning the eSIM profile to the eSIM of the wireless communication device is handled by the intelligence of the eSIM provisioning application. At block 206, the method 200 comprises establishing wireless communication by the eSIM provisioning application with a wireless communication device having an eSIM. Establishing wireless communication by the eSIM provisioning application with the wireless communication device having the eSIM may comprise establishing a series of separate wireless communication sessions in association with the wireless communication device turning itself off and on several times to conserve its battery power. At block 208, the method 200 comprises sending the messages by the eSIM provisioning application to the eSIM of the wireless communication device, whereby the eSIM provisioning application provisions the eSIM of the wireless communication device. Sending the messages by the eSIM provisioning application to the eSIM of the wireless communication device may be referred to in some contexts as mirroring the eSIM of the virtual eSIM provisioning platform (e.g., the virtual eSIM 134 or the physical eSIM 136) to the eSIM of the wireless communication device. This may also be referred to as synchronizing the eSIM of the wireless communication device with the eSIM of the virtual eSIM provisioning platform.

When the provisioning of the eSIM on the wireless communication device has been completed, the eSIM provisioning application may send an eSIM provisioning complete acknowledgement to the user console application, and the user console application may send the eSIM provisioning complete acknowledgement to the user via the user interface (e.g., the user interface 120) and/or to other entities. The acknowledgement may be deemed to indicate that the wireless communication device 102, 112 has completed provisioning and is ready to communicate on a radio access network (RAN) using the access and/or authentication credentials embedded in the eSIM 104, 114. After the provisioning of the eSIM 104, 114 is complete and the acknowledgment is sent, the wireless communication device 102, 112 may be enabled to conduct wireless communication via the cell site 108, 116 using the eSIM profile data configured into the eSIM 104, 114.

Figure 4:
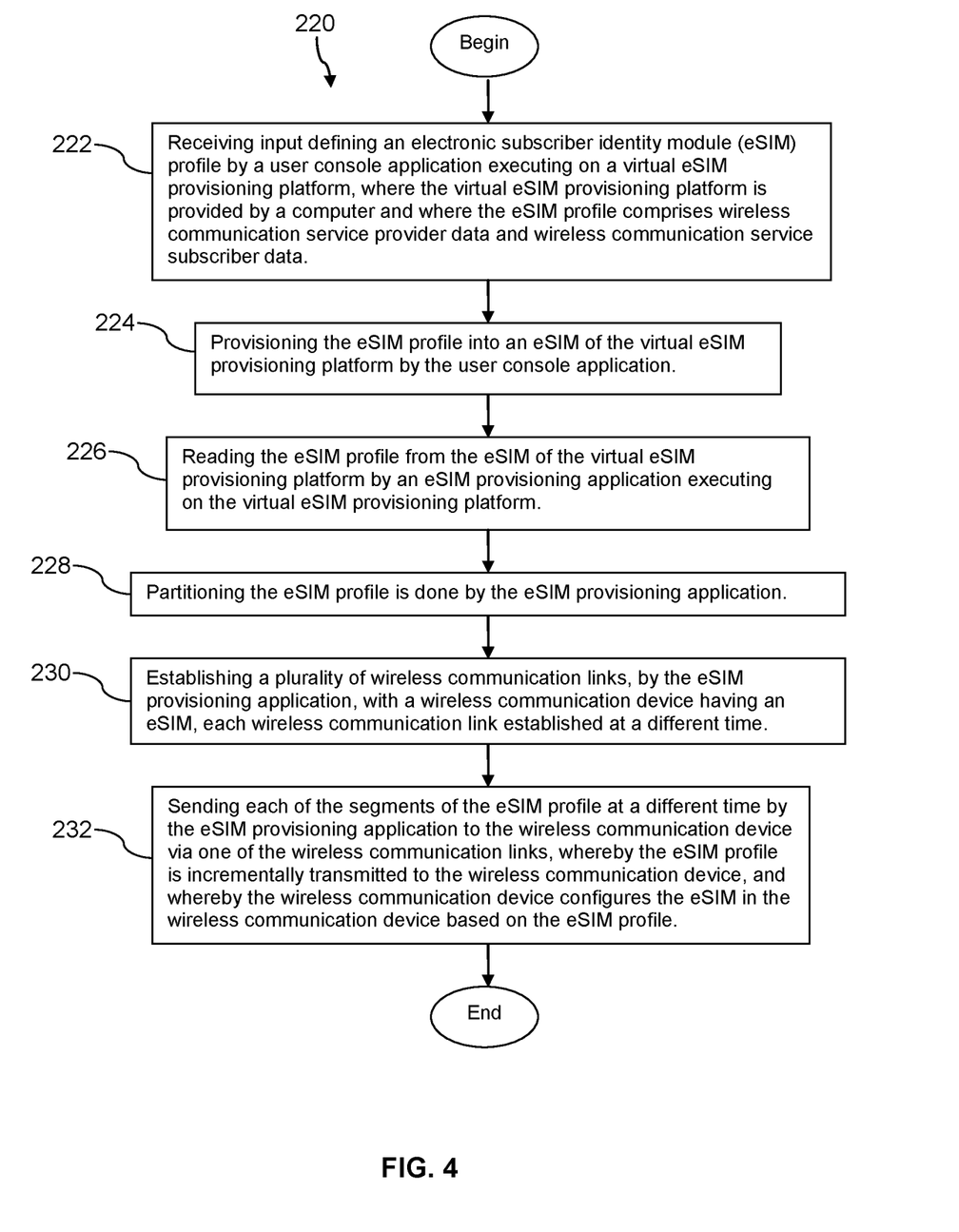
FIG. 4 is a flow chart of another method according to an embodiment of the disclosure.

Turning now to FIG. 4, a method 220 is described. In an embodiment, the method 220 comprises a method of provisioning an electronic subscriber identity module (eSIM) to a wireless communication device. At block 222, the method 220 comprises receiving input defining an electronic subscriber identity module (eSIM) profile by a user console application executing on a virtual eSIM provisioning platform, where the virtual eSIM provisioning platform is provided by a computer and where the eSIM profile comprises wireless communication service provider data and wireless communication service subscriber data.

At block 224, the method 220 comprises provisioning the eSIM profile into an eSIM of the virtual eSIM provisioning platform by the user console application. In an embodiment, the virtual eSIM provisioning platform comprises a physical eSIM, and provisioning the eSIM profile into the eSIM of the virtual eSIM provisioning platform comprises writing the contents of the eSIM profile to the physical eSIM. In another embodiment, the virtual eSIM provisioning platform comprises a virtual eSIM that is a data object stored in a non-transitory memory of the virtual eSIM provisioning platform, and provisioning the eSIM profile into the eSIM of the virtual eSIM provisioning platform comprises writing the eSIM profile into the virtual eSIM (e.g., writing the eSIM profile to a non-transitory memory of the virtual eSIM provisioning platform). At block 226, the method 220 comprises reading the eSIM profile from the eSIM of the virtual eSIM provisioning platform by an eSIM provisioning application executing on the virtual eSIM provisioning platform.

At block 228, the method 220 comprises partitioning the eSIM profile into a plurality of segments by the eSIM provisioning application. At block 230, the method 220 comprises establishing a plurality of wireless communication links, by the eSIM provisioning application, with a wireless communication device having an eSIM, each wireless communication link established at a different time. At block 232, the method 220 comprises sending each of the segments of the eSIM profile at a different time by the eSIM provisioning application to the wireless communication device via one of the wireless communication links, whereby the eSIM profile is incrementally transmitted to the wireless communication device, and whereby the wireless communication device configures the eSIM in the wireless communication device based on the eSIM profile.

In an embodiment, the eSIM provisioning application may send each of the segments of the eSIM profile to a local profile assistant (LPA) executing on the mobile communication device and may delegate to the LPA the activity of mapping the eSIM profile to low level write operations to configure the eSIM based on the eSIM profile. In an embodiment, the eSIM provisioning application sends each of the segments of the eSIM profile accompanied by a low level write operation.

The virtual eSIM framework of method 220 may be said to decouple the defining of the eSIM profile from provisioning the eSIM to the wireless communication device. For example, a user employs the UI 120 to input a definition of the eSIM profile and the user console 124 captures the eSIM profile input. At this point, the user's engagement with the eSIM provisioning process may be deemed completed. The user can turn to other activities. The user console then sends the eSIM profile to the staging eSIM and delegates to the staging eSIM the responsibility for interworking with the mobile communication device to provision the eSIM on the device according to the eSIM profile. The provisioning of the eSIM on the wireless communication device need not take place in real-time—while the user is engaged with the UI 120.

Figure 5:
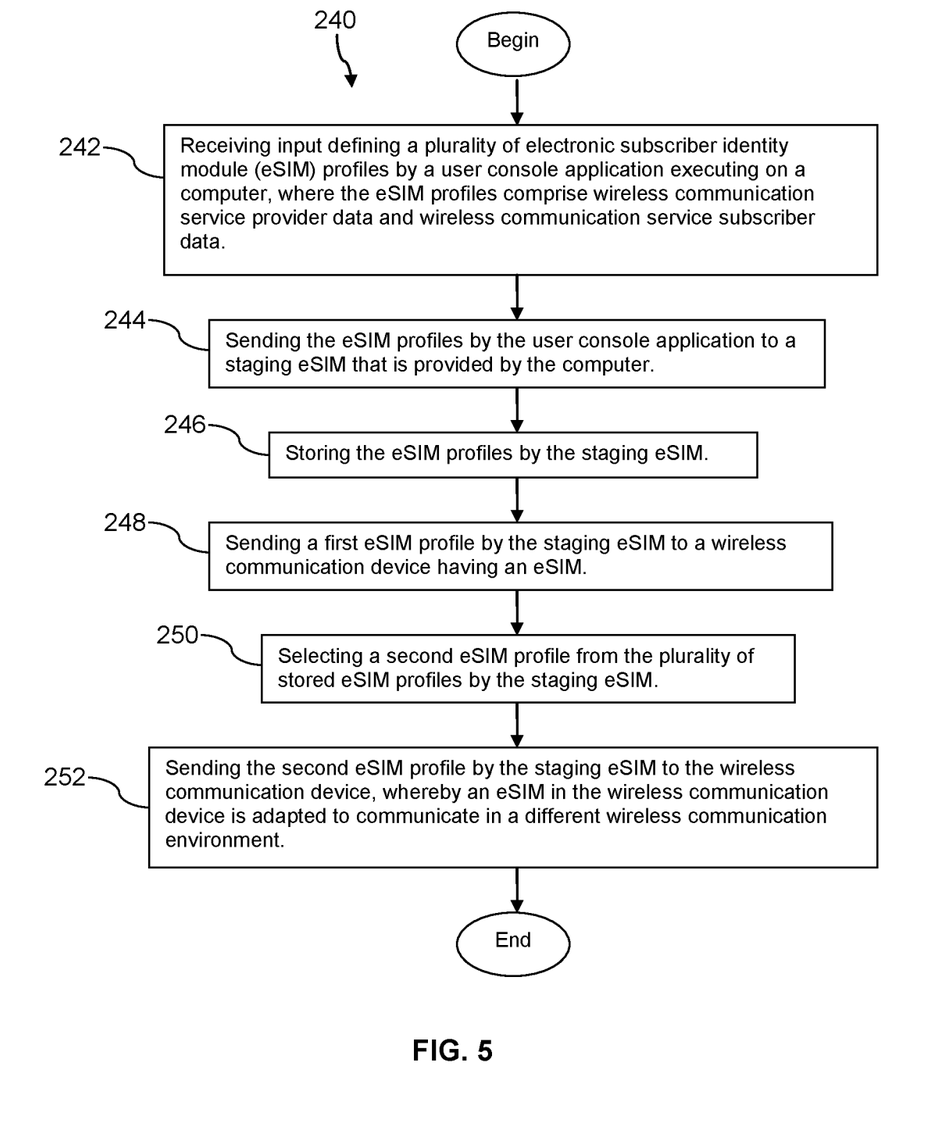
FIG. 5 is a flow chart of yet another method according to an embodiment of the disclosure.

Turning now to FIG. 5, a method 240 is described. In an embodiment, the method 240 is a method of provisioning an electronic subscriber identity module (eSIM) to a wireless communication device. At block 242, the method 240 comprises receiving input defining a plurality of electronic subscriber identity module (eSIM) profiles by a user console application executing on a computer, where the eSIM profiles comprise wireless communication service provider data and wireless communication service subscriber data. At block 244, the method 240 comprises sending the eSIM profiles by the user console application to a staging eSIM that is provided by the computer.

At block 246 the method 240 comprises storing the eSIM profiles by the staging eSIM. At block 248, the method 240 comprises sending a first eSIM profile by the staging eSIM to a wireless communication device having an eSIM.

At block 250, the method 240 comprises selecting a second eSIM profile from the plurality of stored eSIM profiles by the staging eSIM. In an embodiment, the staging eSIM selects the second eSIM profile based on a request received from the wireless communication device. Alternatively, in another embodiment or in a different eSIM provisioning instance, the staging eSIM selects the second eSIM profile based on selection rules configured into the staging eSIM by the user console application. Alternatively, in another embodiment or a different eSIM provisioning instance, the staging eSIM selects the second eSIM profile based on input received by the user console application forwarded to the staging eSIM. It is understood that all three different ways of selecting the second eSIM profile may be present in the same implementation, each different selection mechanism being used under different operation conditions. At block 252, the method 240 comprises sending the second eSIM profile by the staging eSIM to the wireless communication device, whereby an eSIM in the wireless communication device is adapted to communicate in a different wireless communication environment.

Figure 6:
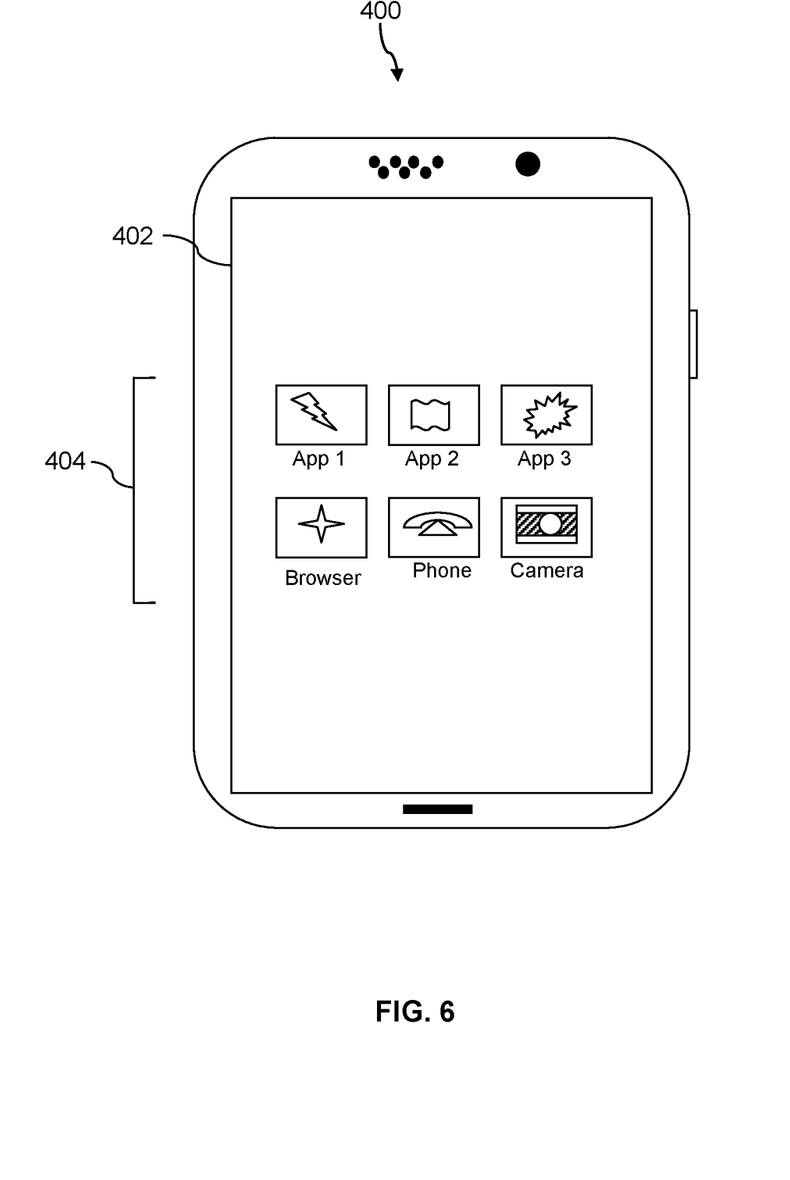
FIG. 6 is an illustration of a wireless communication device according to an embodiment of the disclosure.

FIG. 6 depicts the user equipment (UE) 400, which is operable for implementing aspects of the present disclosure (e.g., the wireless communication devices 102, 112), but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 7:
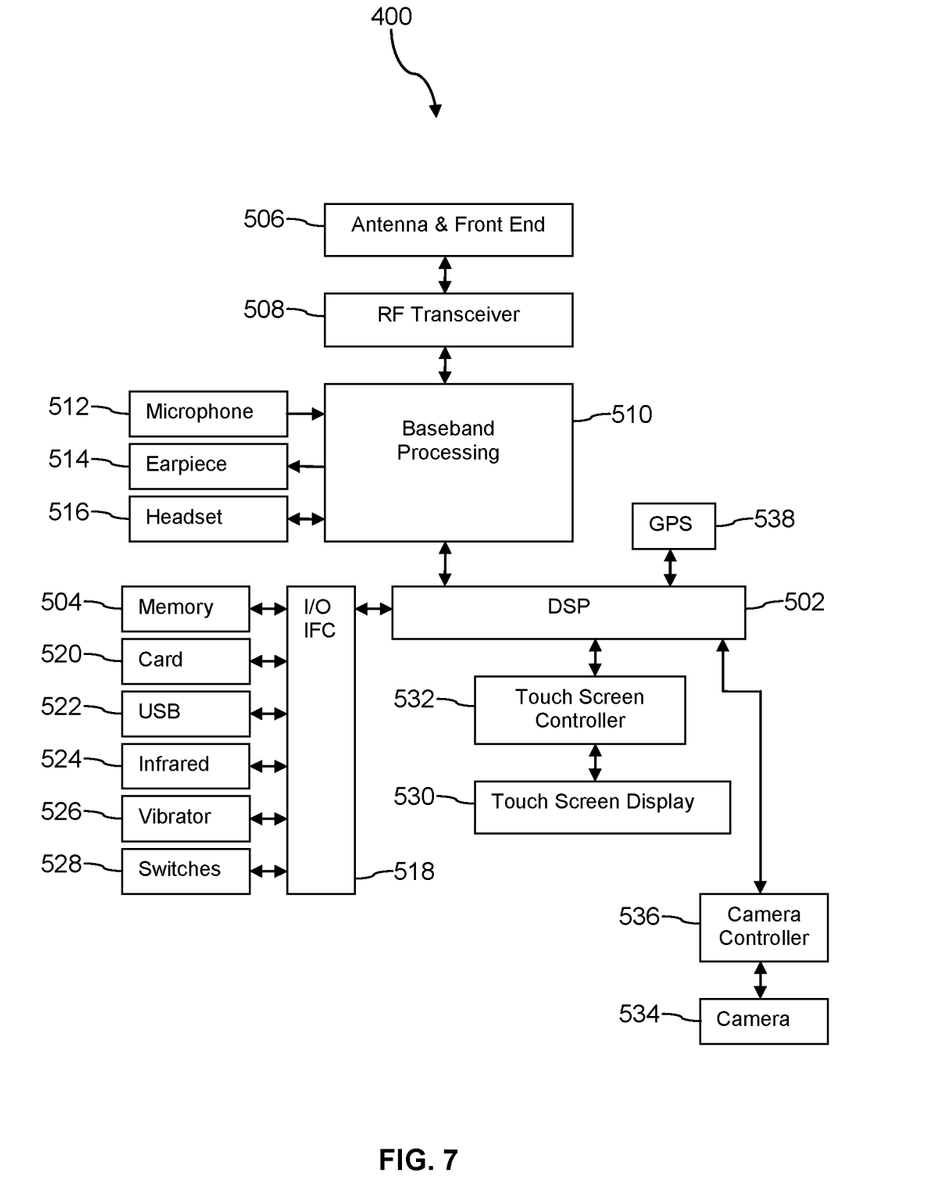
FIG. 7 is a block diagram of a hardware architecture of a wireless communication device according to an embodiment of the disclosure.

FIG. 7 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen controller 532 couples the DSP 502 to the touch screen display 530. The GPS receiver 538 is coupled to the DSP 502 to decode global positioning system signals, thereby enabling the UE 400 to determine its position.

Figure 8A:
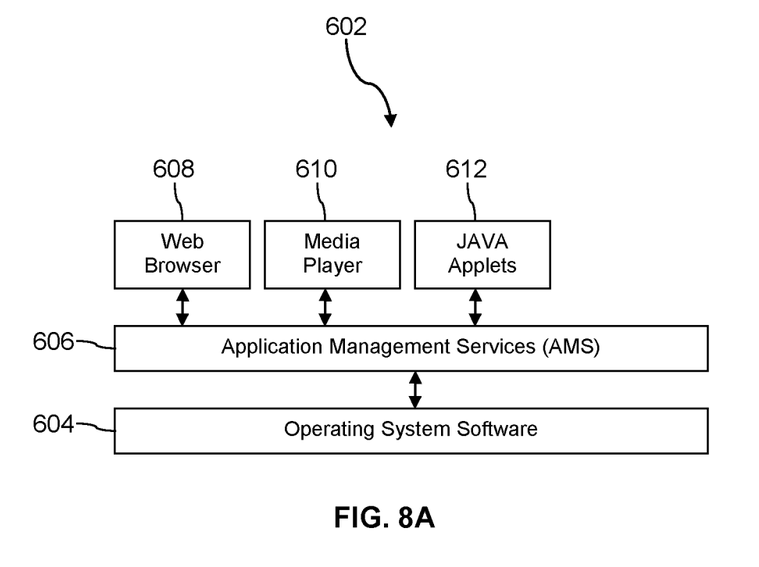
FIG. 8A is a software architecture of a wireless communication device according to an embodiment of the disclosure.

FIG. 8A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 8A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 8B:
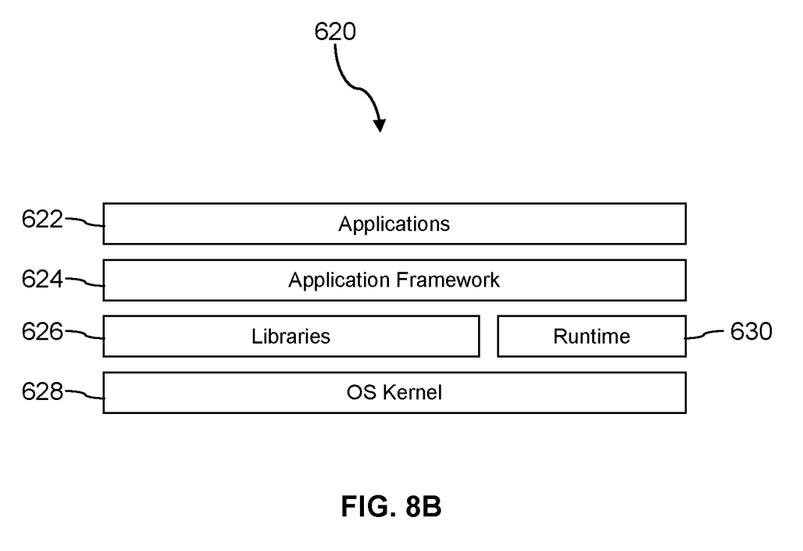
FIG. 8B is another software architecture of a wireless communication device according to an embodiment of the disclosure.

FIG. 8B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 9:
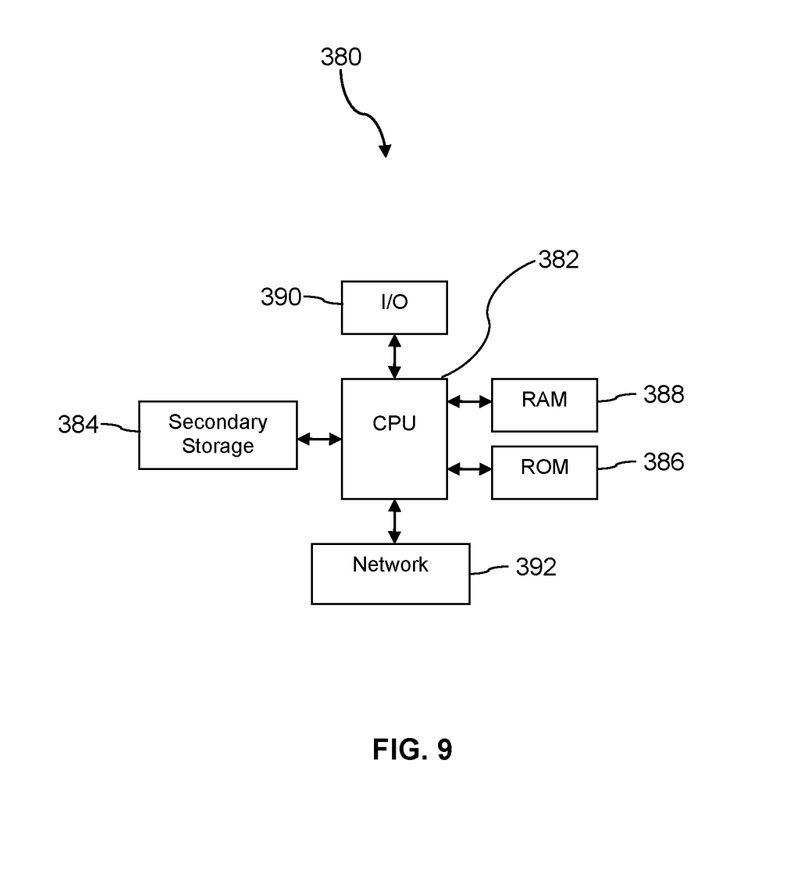
FIG. 9 is a block diagram of a computer system according to an embodiment of the disclosure.

FIG. 9 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplexing (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identification (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of provisioning an electronic subscriber identity module (eSIM) to a wireless communication device, comprising:

receiving input defining an electronic subscriber identity module (eSIM) profile by a user console application executing on a virtual eSIM provisioning platform, where the virtual eSIM provisioning platform is provided by a computer and where the eSIM profile comprises wireless communication service provider data and wireless communication service subscriber data;

provisioning the eSIM profile into an eSIM of the virtual eSIM provisioning platform by the user console application;

reading the eSIM profile from the eSIM of the virtual eSIM provisioning platform by an eSIM provisioning application executing on the virtual eSIM provisioning platform;

partitioning the eSIM profile into a plurality of segments by the eSIM provisioning application;

establishing a plurality of wireless communication links, by the eSIM provisioning application, with a wireless communication device having an eSIM, each wireless communication link established at a different time; and sending each of the segments of the eSIM profile at a different time by the eSIM provisioning application to the wireless communication device via one of the wireless communication links, whereby the eSIM profile is incrementally transmitted to the wireless communication device, and whereby the wireless communication device configures the eSIM in the wireless communication device based on the eSIM profile.

2. The method of claim 1, wherein the virtual eSIM provisioning platform decouples the defining of the eSIM profile from provisioning the eSIM to the wireless communication device.

3. The method of claim 1, wherein the virtual eSIM provisioning platform comprises a physical eSIM and wherein provisioning the eSIM profile into the eSIM of the virtual eSIM provisioning platform comprises writing the eSIM profile to the physical eSIM.

4. The method of claim 1, wherein the virtual eSIM provisioning platform comprises a virtual eSIM that is a data object stored in a non-transitory memory of the virtual eSIM provisioning platform and wherein provisioning the eSIM profile into the eSIM of the virtual eSIM provisioning platform comprises writing the eSIM profile into the virtual eSIM.

5. The method of claim 1, wherein the eSIM provisioning application sends each of the segments of the eSIM profile to a local profile assistant (LPA) executing on the wireless communication device and delegates to the LPA the activity of mapping the eSIM profile to low level write operations to configure the eSIM based on the eSIM profile.

6. The method of claim 1, wherein the eSIM provisioning application sends each of the segments of the eSIM profile accompanied by a low level write operation.

7. The method of claim 1, wherein the wireless communication device is an Internet of things (IoT) device.

* * * * *